(12) United States Patent
Bruckmeier et al.

(10) Patent No.: US 11,858,526 B2
(45) Date of Patent: Jan. 2, 2024

(54) APPARATUS AND METHOD FOR USE WITH VEHICLE

(71) Applicant: Bayerische Motoren Werke Aktiengesellschaft, Munich (DE)

(72) Inventors: Robert Bruckmeier, Munich (DE); Icy Zhu, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/263,112

(22) PCT Filed: Jul. 26, 2018

(86) PCT No.: PCT/CN2018/097174
§ 371 (c)(1),
(2) Date: Jan. 25, 2021

(87) PCT Pub. No.: WO2020/019231
PCT Pub. Date: Jan. 30, 2020

(65) Prior Publication Data
US 2021/0300404 A1    Sep. 30, 2021

(51) Int. Cl.
*B60W 50/16*    (2020.01)
*B60H 3/00*    (2006.01)
*B60Q 9/00*    (2006.01)
*B60W 40/09*    (2012.01)
(Continued)

(52) U.S. Cl.
CPC ........... *B60W 50/16* (2013.01); *B60H 3/0035* (2013.01); *B60Q 9/00* (2013.01); *B60W 40/09* (2013.01); *G08B 21/02* (2013.01); *B60W 2050/143* (2013.01); *B60W 2050/146* (2013.01); *B60W 2420/42* (2013.01); *B60W 2540/215* (2020.02); *B60W 2540/225* (2020.02)

(58) Field of Classification Search
CPC ................. B60W 50/16; B60W 40/09; B60W 2540/215; B60W 2540/225; B60W 2050/143; B60W 2050/146; B60W 2420/42; B60H 3/0035; B60Q 9/00; G08B 21/02
USPC ........................................................ 340/439
See application file for complete search history.

(56) References Cited

U.S. PATENT DOCUMENTS

| | | | | |
|---|---|---|---|---|
| 7,126,583 | B1 * | 10/2006 | Breed | B60K 37/06 345/173 |
| 9,524,080 | B1 * | 12/2016 | Fram | G06T 15/005 |
| 10,162,651 | B1 * | 12/2018 | Zhu | G06F 9/453 |

(Continued)

FOREIGN PATENT DOCUMENTS

| | | |
|---|---|---|
| CN | 105527710 A | 4/2016 |
| CN | 107310476 A | 11/2017 |

OTHER PUBLICATIONS

PCT/CN2018/097174, International Search Report dated Feb. 11, 2019 (Two (2) pages).

*Primary Examiner* — Zhen Y Wu
(74) *Attorney, Agent, or Firm* — Crowell & Moring LLP (57) ABSTRACT

An apparatus for use with vehicle includes one or more cameras located in the vehicle, used to detect a figure and/or a behavior of a user sat in the vehicle. The apparatus also includes a controller communicated with the cameras, which obtains the detected figure and/or behavior of the user, and optimizes one or more components of the vehicle for the user, based on the detected figure and/or behavior of the user.

20 Claims, 5 Drawing Sheets

200 obtaining a figure and/or a behavior of a user sat in the vehicle, which is detected by using one or more cameras located in the vehicle
210

↓ optimizing one or more components of the vehicle for the user, based on the detected figure and/or behavior of the user
220

(51) Int. Cl.
*G08B 21/02* (2006.01)
*B60W 50/14* (2020.01)

(56) References Cited

U.S. PATENT DOCUMENTS

| | | | | |
|---|---|---|---|---|
| 10,185,392 B2* | 1/2019 | Mueller | ............... | G06F 3/147 |
| 10,324,528 B2 | 6/2019 | Cederlund et al. | | |
| 2007/0219709 A1* | 9/2007 | Ikeda | ............... | G02B 27/01 |
| | | | | 701/516 |
| 2009/0027332 A1* | 1/2009 | Cieler | ............... | B60K 35/00 |
| | | | | 345/1.1 |
| 2009/0040297 A1* | 2/2009 | Harada | ............... | G09G 3/3648 |
| | | | | 348/54 |
| 2010/0079270 A1* | 4/2010 | Krautter | ............... | G06F 3/013 |
| | | | | 340/436 |
| 2010/0238280 A1* | 9/2010 | Ishii | ............... | G02B 27/01 |
| | | | | 348/77 |
| 2014/0028542 A1* | 1/2014 | Lovitt | ............... | G06F 3/017 |
| | | | | 345/156 |
| 2014/0293053 A1* | 10/2014 | Chuang | ............... | B60K 28/066 |
| | | | | 348/148 |
| 2014/0354692 A1* | 12/2014 | Ng-Thow-Hing | ............... | G02B 27/01 |
| | | | | 345/633 |
| 2015/0077237 A1 | 3/2015 | Chou et al. | | |
| 2016/0004321 A1* | 1/2016 | Takada | ............... | G06V 40/169 |
| | | | | 345/156 |
| 2016/0125631 A1* | 5/2016 | Ham | ............... | G02B 27/0179 |
| | | | | 345/633 |
| 2016/0196098 A1* | 7/2016 | Roth | ............... | G09G 5/00 |
| | | | | 715/761 |
| 2016/0214531 A1* | 7/2016 | Bachorski | ............... | B60K 35/00 |
| 2016/0297362 A1* | 10/2016 | Tijerina | ............... | H04N 23/698 |
| 2016/0325683 A1* | 11/2016 | Hayashi | ............... | H04N 13/383 |
| 2018/0231772 A1* | 8/2018 | Han | ............... | G02B 27/0101 |
| 2018/0247611 A1* | 8/2018 | Carey | ............... | G09G 5/30 |
| 2019/0162958 A1* | 5/2019 | Kobashigawa | ............... | A61B 3/066 |
| 2019/0197327 A1* | 6/2019 | Mangla | ............... | G06T 11/00 |

* cited by examiner

```
obtaining a figure of a driver of the vehicle
310
```
↓
```
controlling to adjust a position of at least one of the
components so as to facilitate the driver to operate the
vehicle, based on the detected figure of the driver
320
```

```
obtaining a behavior of the user
510
            │
            ▼
controlling to present a content to the user via the one or
more components, based on the detected behavior of the user
520
```

```
obtaining, over a time period, behaviors of the user at the
time when watching contents displayed on one or more
displays of the vehicle
610
                    │
                    ▼
obtaining preference of the user based on the detected
behaviors of the user associated with their corresponding
watched contents
621
                    │
                    ▼
optimizing to present a content for the user, based on the
preference of the user
622
```

| selecting one or more preferred contents to be displayed on one of the displays from candidate contents, based on the preference of the user 622-1 | recommending one or more preferred contents to be displayed on one of the displays, based on the preference of the user 622-2 | determining a displaying format for a content to be displayed on one of the displays, based on the preference of the user 622-3 | selecting at least one presentation channels for presenting a content to the user, based on the preference of the user 622-4 |

APPARATUS AND METHOD FOR USE WITH VEHICLE

BACKGROUND AND SUMMARY OF THE INVENTION

The present disclosure relates in general to a field of a vehicle, and in particular, to an apparatus, a method and a non-transitory computer readable medium for use with a vehicle.

Currently, in-vehicle cameras are not often used and only used for safety-related functions which are quite limited. There is a need to use the in-vehicle cameras more efficiently.

One of aims of the present disclosure is to provide an improved apparatus and method for use with a vehicle.

In accordance with a first exemplary embodiment of the present disclosure, an apparatus for use with a vehicle is provided, comprising: one or more cameras located in the vehicle, used to detect a figure and/or a behavior of a user sat in the vehicle; and a controller in communication with the cameras, configured to: obtain the detected figure and/or behavior of the user; and optimize one or more components of the vehicle for the user, based on the detected figure and/or behavior of the user.

In accordance with a second exemplary embodiment of the present disclosure, a computer-implemented method for use with a vehicle is provided, comprising steps of: obtaining a figure and/or a behavior of a user sat in the vehicle, which is detected by using one or more cameras located in the vehicle; and optimizing one or more components of the vehicle for the user, based on the detected figure and/or behavior of the user.

In accordance with a third exemplary embodiment of the present disclosure, an apparatus for use with a vehicle is provided, comprising: one or more processors; and one or more memories configured to store a series of computer executable instructions, wherein the series of computer executable instructions, when executed by the one or more processors, cause the one or more processors to perform the steps of the above mentioned method.

In accordance with a fourth exemplary embodiment of the present disclosure, a non-transitory computer readable medium having instructions stored thereon that, when executed by one or more processors, causing the one or more processors to perform the steps of the above mentioned method is provided.

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from the following detailed description.

BRIEF DESCRIPTION OF THE DRAWINGS

The above and other aspects and advantages of the present disclosure will become apparent from the following detailed description of exemplary embodiments taken in conjunction with the accompanying drawings which illustrate, by way of example, the principles of the present disclosure. Note that the drawings are not necessarily drawn to scale.

DETAILED DESCRIPTION OF THE DRAWINGS

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

The term "vehicle" used throughout the specification refers to a motor vehicle which comprises but is not limited to a car, a truck, a bus, or the like. The term "A and/or B" used throughout the specification refers to "A", "B", or "A and B", and the term "A or B" used through the specification refers to "A and B" and "A or B" rather than meaning that A and B are exclusive, unless otherwise specified.

Figure 1:
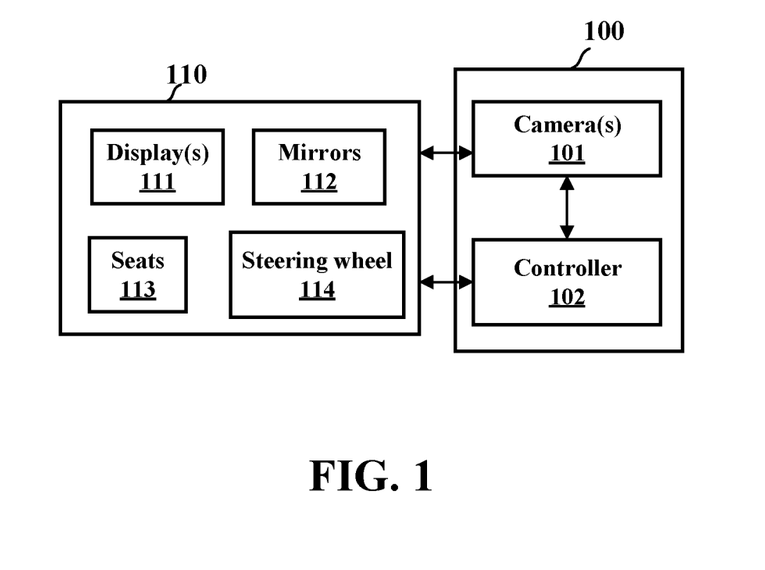
FIG. 1 illustrates a block diagram of an apparatus for use with a vehicle in accordance with one or more exemplary embodiments of the present disclosure.

Referring first to FIG. 1, there is shown a block diagram of an apparatus 100 for use with a vehicle 110 in accordance with one or more exemplary embodiments of the present disclosure. The apparatus 100 comprises one or more cameras 101 located in the vehicle 110, and a controller 102 communicated with the cameras 101.

One or more of the cameras 101 may be used to detect a figure and/or a behavior of a user sat in the vehicle 110, including the driver and the passengers. In some embodiments, the camera(s) 101 can capture images and/or videos for any user, so that a figure and/or a behavior of the user can be obtained from the captured images and/or videos. In some cases, additionally the camera(s) 101 may have an infrared imaging/sensing function. In some embodiments, the figure of the user may show the body shape of the user, including the eye position, which can be used to estimate a position of a component of the vehicle 110 suitable for the user. In some embodiments, the detected behavior may comprise an eye movement, a gaze direction, a facial expression, a body motion or the like. The figure and/or behavior of the user may be obtained at the camera(s) 101 side or the controller 102 side. In other words, the figure and/or behavior of the user may be extracted from the captured data of the camera (s) 101 by the camera(s) 101 or by the controller 102.

In some embodiments, the camera(s) 101 may comprise at least one of: a driver surveillance camera, a camera contained in a driver assistance system, a camera contained in a mobile phone, a camera contained in a laptop or a camera mounted in a rear-seat display. For example, the cameras already mounted for driver surveillance/assistance in the vehicle can also serve as the camera(s) 101 of the present disclosure. In this case, the cameras can detect at least the figure and/or behavior of the driver. In some embodiments, the camera contained in a mobile phone, a laptop or a rear-seat display may be used to detect the figure and/or behavior of the passenger or the driver when he/she is not driving. In other embodiments, the camera(s) 101 may be camera(s) dedicated for implementing the present invention, which may be extra mounted within the vehicle 110.

The detected figure and/or behavior of the user is obtained by the controller 102. Then, the controller 102 optimizes one or more components of the vehicle 110 for the user, based on the detected figure and/or behavior of the user. The specific operations performed by the controller 102 will be described in details later. The controller 102 may be a processor, a microprocessor or the like. The controller 102 may be provided on the vehicle 110, for example, at the central console of the vehicle 110, or integrated into the central console. Alternatively, the controller 102 may be provided remotely and may be accessed via various networks or the like.

As shown in FIG. 1, in some embodiments, the vehicle 110 may comprise various controllable components, including display(s) 111 (such as a dashboard, a central information display, a Head-Up Display (HUD) or a rear-seat display), mirrors 112 (e.g., a rear-view mirror, or side-view mirrors), seats 113, a steering wheel 114, or the like, which can be optimized by the controller 102 for the user. It will be apparent to those skilled in the art that, these components are listed here only for illustrative purpose rather than limiting the present disclosure.

In some embodiments, as shown in FIG. 1, the camera(s) 101 and the controller 102 both may be communicated with various components of the vehicle 110, although the communication between the camera(s) 101 and the vehicle 110 is not necessary for the present invention. In FIG. 1, a bi-directional arrow between the components represents a communication path therebetween, which may be a direct connection via tangible wire(s) or in a wireless way (such as via radio, RF, or the like). In other embodiments, the communication between the components may be established indirectly, for example, via a network (not shown) or other intermediate component (such as a relay component). In some cases that the communications are established via a network, the network may include a local area network (LAN), a wide area network (WAN) (e.g., the Internet), a virtual network, a telecommunications network, and/or other interconnected paths across which multiple entities may communicate. In some embodiments, the network includes Bluetooth® communication networks or a cellular communications network for sending and receiving data via e.g. short messaging service (SMS), multimedia messaging service (MMS), hypertext transfer protocol (HTTP), direct data connection, WAP, e-mail, etc. In other embodiments, the network may be a mobile data network such as CDMA, GPRS, TDMA, GSM, WIMAX, 3G, 4G, LTE, VoLTE, or any other mobile data network or combination of mobile data networks.

The features, types, numbers, and locations of the camera (s) 101, the controller 102 and the components of the vehicle 110 as well as the communications therebetween have been described in detail. But as can be easily understood by those skilled in the art, the features, types, numbers, and locations of the above components are not limited to the illustrated embodiments, but can be adapted/altered according to the actual requirements.

As described above, one or more components of the vehicle can be optimized/customized/personalized for the user automatically by utilizing the cameras in the vehicle, that is to say, the vehicle can behave more intelligently to the user, and thus the user experience can be improved. Additionally, in the case that the cameras already existing in the vehicle serve as the camera(s) 101 of the present disclosure, the cameras can be utilized more efficiently.

Next, the operations of the controller 102 will be described in detail.

Figure 2:
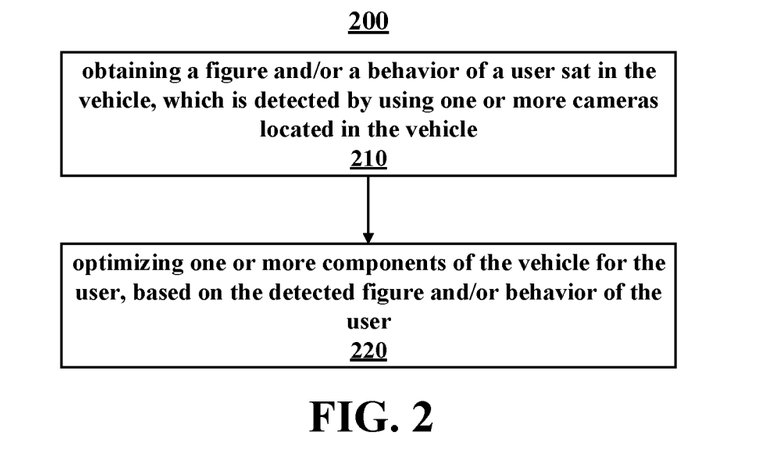
FIG. 2 illustrates a flow chart showing a method for use with a vehicle in accordance with one or more exemplary embodiments of the present disclosure.

Referring to FIG. 2, it illustrates a flow chart showing a method 200 for use with a vehicle in accordance with one or more exemplary embodiments of the present disclosure.

It should be understood by those skilled in the art that, the method 200, as well as methods 300, 500, 600 and 700 as will be described below with reference to FIGS. 3 and 5-7, may be performed by e.g. the above-described controller 102 of FIG. 1, or other apparatus. The steps of the methods 200, 300, 500, 600 and 700 presented below are intended to be illustrative. In some embodiments, these methods may be accomplished with one or more additional steps not described, and/or without one or more of the steps discussed. Additionally, in some embodiments, the methods may be implemented in one or more processing devices. The one or more processing devices may include one or more modules executing some or all of the steps of methods in response to instructions stored electronically on an electronic storage medium. The one or more processing modules may include one or more devices configured through hardware, firmware, and/or software to be specifically designed for execution of one or more of the steps of methods.

As shown in FIG. 2, at step 210, a figure and/or a behavior of a user sat in the vehicle is obtained. The figure and/or behavior is detected by using one or more cameras located in the vehicle.

At step 220, one or more components of the vehicle are optimized for the user, based on the detected figure and/or behavior of the user.

In some implementations of the above method 200, the step 210 may comprise: obtaining a figure of a driver of the vehicle, which is detected by using the one or more cameras, and the step 220 may comprise: controlling to adjust a position of at least one of the components so as to facilitate the driver to operate the vehicle, based on the detected figure of the driver. For example, the method 200 may be specifically implemented as method 300 shown in FIG. 3.

Figure 3:
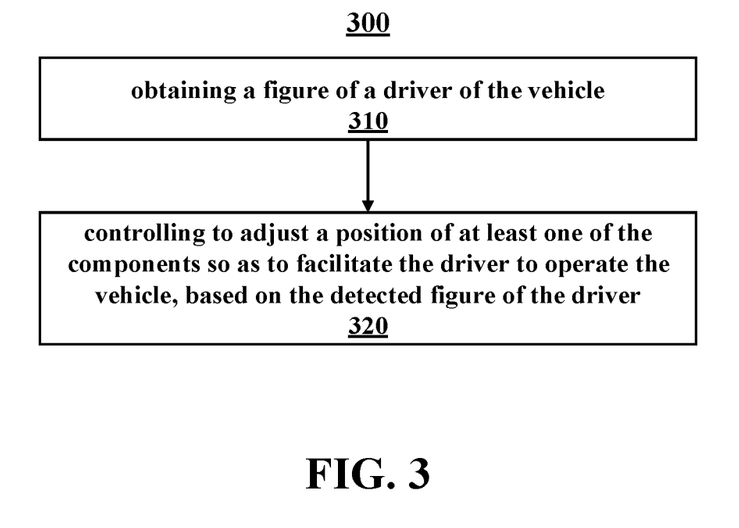
FIG. 3 illustrates a flow chart showing a method for use with a vehicle in accordance with one or more exemplary embodiments of the present disclosure.

FIG. 3 illustrates a flow chart of a specific example of the method 200. In this example, the user to be detected is a driver of the vehicle. As shown in FIG. 3, at step 310, a figure of the driver is obtained. The figure is detected by using one or more cameras located in the vehicle. At step 320, at least one of the components of the vehicle is controlled to adjust its position so as to facilitate the driver to operate the vehicle, based on the detected figure of the driver. In some cases, the figure of the driver may comprise an eye position of the driver, and the position may be adjusted based on the detected eye position of the driver.

Figure 4:
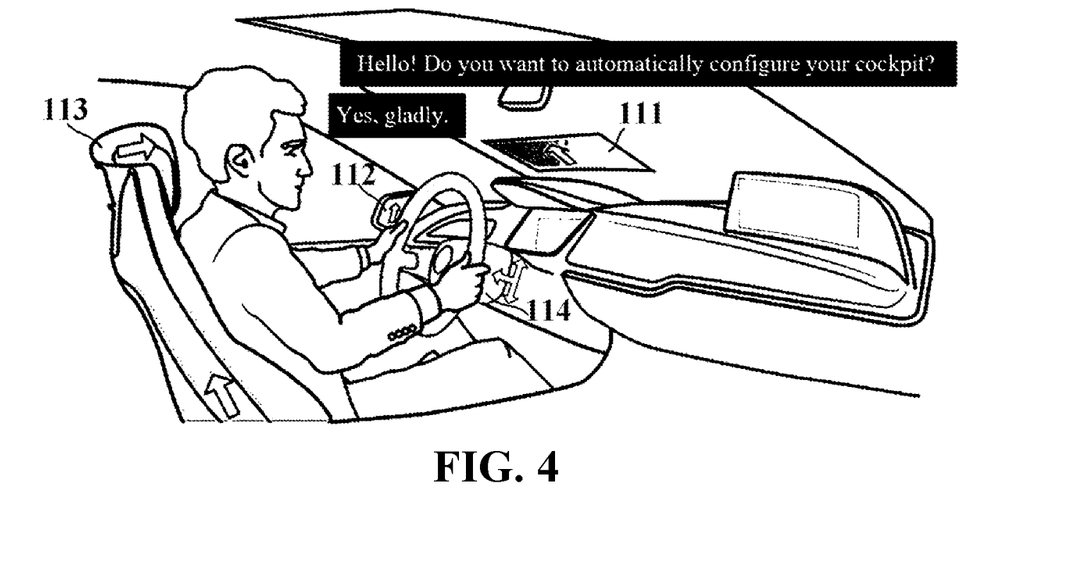
FIG. 4 illustrates an example for the method shown in FIG. 3 in accordance with one or more exemplary embodiments of the present disclosure.

An example implementation of the method 300 is shown in FIG. 4. In FIG. 4, when the driver sits in the vehicle without any setting and before he drives the vehicle, some components of the vehicle can be adjusted automatically so as to facilitate the driver to operate the vehicle. Before adjusting the components, the vehicle may ask for the driver's permission via a visual component or an audio component, as shown in FIG. 4. For example, the vehicle may display or voice "Hello! Do you want to automatically configure your cockpit?", and the driver may choice or answer "Yes, gladly." Then the method 300 starts. The camera(s) 101 detects the figure of the driver including the eye position, and the positions of the HUD 111, the side-view mirror 112, the driver' seat 113 and the steering wheel 114 can be automatically adjusted to the best place in directions as indicated by the arrows in FIG. 4, based on the detected figure of the driver. For example, the positions of the HUD 111 and the side-view mirror 112 can be adjusted based on the detected eye position.

In some implementations, the step 210 may comprise: obtaining a behavior of a user of the vehicle, which is detected by using the one or more cameras, and the step 220 may comprise: controlling to present a content to the user via the one or more components, based on the detected behavior of the user. For example, the method 200 may be specifically implemented as method 500 shown in FIG. 5.

Figure 5:
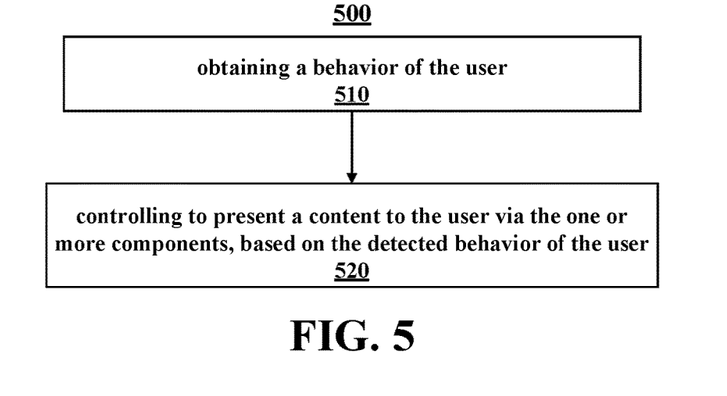
FIG. 5 illustrates a flow chart showing a method for use with a vehicle in accordance with one or more exemplary embodiments of the present disclosure.

FIG. 5 illustrates a flow chart of a specific example of the method 200. In this example, the user to be detected can be a driver or a passenger. As shown in FIG. 5, at step 510, a behavior of the user is obtained. The behavior is detected by using one or more cameras located in the vehicle. At step 520, the one or more components are controlled to present a content to the user via the one or more components, based on the detected behavior of the user. The one or more components may be controlled by the controller 102 of FIG. 1 directly or indirectly (e.g., via an intermediate component like an actuator).

In some cases that the content to be presented is a driving safety message and the user is a driver of the vehicle, the detected behavior may indicate whether the driver is watching a display of the vehicle or not. Accordingly, in the step 520, in response to the detected behavior indicating the driver is watching a display of the vehicle, the watched display is controlled to display the driving safety message, and in response to the detected behavior indicating the driver is not watching any display of the vehicle, other component(s) than display(s) 111 is controlled to present the driving safety message to the user via an audio output, a haptic output, and/or an odor output.

For example, when a camera disposed outside the vehicle detects a limit speed from e.g. road traffic signs, which is lower than the real-time speed of the vehicle, there is a need to warn the driver by presenting a driving safety message to he/she, such as displaying/voicing "Please slow down!" or "Overspeed!", issuing a particular sound, vibrating the steering wheel or the seat, releasing a particular odor and/or the like. The channel for presenting the driving safety message can be determined based on the detected behavior of the driver. For example, in the case of detecting the driver is watching a display e.g. a dashboard typically behind the steering wheel, the driving safety message may be displayed on the dashboard; otherwise, the driving safety message may be presented to the user via other channel. Thus, it is ensured for the driver to instantly follow the driving safety message, and the safety during the driving can be improved.

In some implementations of the above method 500, the step 510 may comprise: obtaining, over a time period, behaviors of the user at the time when watching contents displayed on one or more displays of the vehicle, which are detected by using the one or more cameras, and the step 520 may comprise: obtaining preference of the user based on the detected behaviors of the user associated with their corresponding watched contents; and optimizing one or more of the components to present a content for the user, based on the preference of the user. For example, the method 500 may be specifically implemented as method 600 shown in FIG. 6.

Figure 6:
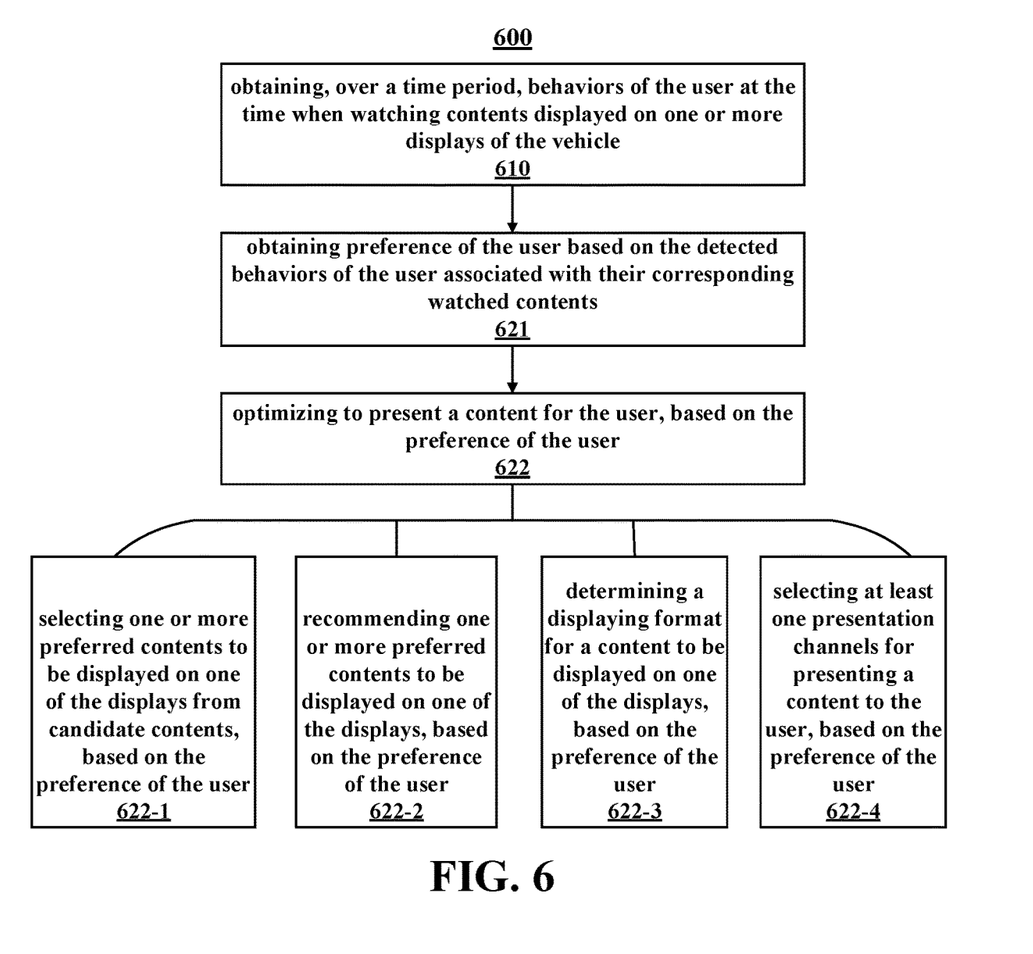
FIG. 6 illustrates a flow chart showing a method for use with a vehicle in accordance with one or more exemplary embodiments of the present disclosure.

FIG. 6 illustrates a flow chart of a specific example of the method 500. In this example, the user to be detected may be a driver or a passenger.

As shown in FIG. 6, at step 610, behaviors of the user at the time when watching contents displayed on one or more displays of the vehicle are obtained over a time period. The behaviors are detected by using the camera(s) 101. In some cases, the time period may be a plurality of minutes, hours, days, months or years. In other cases, the time period may comprise all the past.

In some embodiments, the watched contents may comprise at least one of driving information, a text, a logo, an icon, a graphic, a movie, a list, a news, a navigation address, a message, or a phone number.

In some embodiments, the detected behaviors may comprise an eye movement, a gaze direction, a facial expression, a body motion or the like. For example, the camera(s) 101 can detect where the user looks and how, e.g., the time spent on the content by the user, the facial expression or body motion of the user when watching the content. In addition, the camera(s) 101 can track/identify eye movements or gaze directions typical for recognizing a logo or reading text.

The sentiment of the user when watching the content, e.g., boredom, interest, excitement, laughter, anger, surprise, can be obtained by analyzing the facial expression and/or body motion (such as the motion of head, shoulder, arms or the like).

At step 621, preference of the user is obtained based on the detected behaviors of the user associated with their corresponding watched contents.

In some embodiments, the preference can be reflected by a user preference model established by artificial intelligence, such as a machine learning approach, based on the detected behaviors associated with the watched contents.

In some embodiments, the preference of the user may comprise: preferred content, preferred type of content, content of interest, type of content of interest, preferred presentation format, preferred presentation channel or the like.

In some embodiments, the preference of the user may be obtained by: extracting information regarding the respective watched contents from the behaviors of the user associated with their corresponding contents, the information including at least one of: time spent on the content by the user, sentiment of the user when watching the content, classifying information of the content, a transitionary effect for displaying the content (e.g. content sliding graphically), an interesting portion in the content, metadata of the content, or a key word of the content; and obtaining the preference of the user based on the extracted information.

At step 622, the components of the vehicle are optimized to present a content for the user, based on the preference of the user.

In some embodiments, the optimizing step 622 may comprise at least one of following steps 622-1, 622-2, 622-3 and 622-4:

Step 622-1: selecting one or more preferred contents to be displayed on one of the displays from candidate contents, based on the preference of the user;

Step 622-2: recommending one or more preferred contents to be displayed on one of the displays, based on the preference of the user;

Step 622-3: determining a displaying format (e.g., how to display, summarized text or full text, more/less graphics, or the like) for a content to be displayed on one of the displays, based on the preference of the user;

Step 622-4: selecting at least one presentation channels for presenting a content to the user, based on the preference of the user, wherein the presentation channels are configured to provide at least one of a visual output, an audio output, a haptic output, or an odor output for the content.

For example, from the past detected behaviors of a driver, it can be learned that, when watching the dashboard behind the steering wheel, he/she is most likely to watch the speed. Thus, once detecting that the driver becomes watching the dashboard, the speed may be highlighted, enlarged or displayed in other eye-catching way on the dashboard. In other embodiments, from the past detected behaviors of the driver, it can be learned which of presenting manners/channels is the most effective for the driver, for example, in which presenting manner/channel, the time spent by the driver on the content is shortest or the response of the driver to the content is fastest. Then, the driving information, the driving safety message and other kinds of safety-related information can be presented in the most effective way to the driver, which may improve the safety.

For another example, when the user is browsing through several pieces of news shown on a display, the camera can detect the user's gaze directions, eye movements, facial expressions, body motions, and/or the like. From these behaviors detected over a time period, some reactions of the user to the news can be extracted, e.g., the time spent on each piece of the news by the user, the sentiment of the user when watching each piece of the news, and so on. Combining the extracted reactions with the information (e.g., classifying information, metadata, key word) of the corresponding news, the preference (e.g., the interest) of the user can be obtained. Then, news to be displayed for the user will be optimized so as to match the user's interest. For example, from the behaviors detected by the camera over several days/months or a specified time period, it can be learned that, the user spent the most time on sports news, i.e., the user is most interested in sports news. Then in future sports news will be displayed on top of the display, will be recommended to the user, will be displayed to the user in the most eye-catching way, or the like.

In view of the above, the attractiveness/importance of new potential content to the user can be predicted, more relevant content can be displayed on the display, and/or new content can be presented to the user in his/her preferred or effective way, given the past detected behaviors associated with the contents. Thus, the user experience can be improved, and in some applications, the safety can also be improved.

In some implementations of the above method 600, the user is a driver of the vehicle, and the content to be presented is the driving safety message. The method 600 may further comprise: obtaining a behavior indicating whether the driver is watching one of the displays of the vehicle or not at the time when a driving safety message is obtained, which is detected by using the one or more cameras. The step 622 may be implemented as: in response to the behavior indicating the driver is watching one of the displays of the vehicle, controlling to display the driving safety message on the watched display in a manner optimized for the driver based on the preference of the driver; and in response to the behavior indicating the driver is not watching any display of the vehicle, controlling to present the driving safety message to the driver via an audio output, a haptic output, and/or an odor output from one or more of the components, based on the preference of the driver. For example, the method 600 may be specifically implemented as method 700 shown in FIG. 7.

Figure 7:
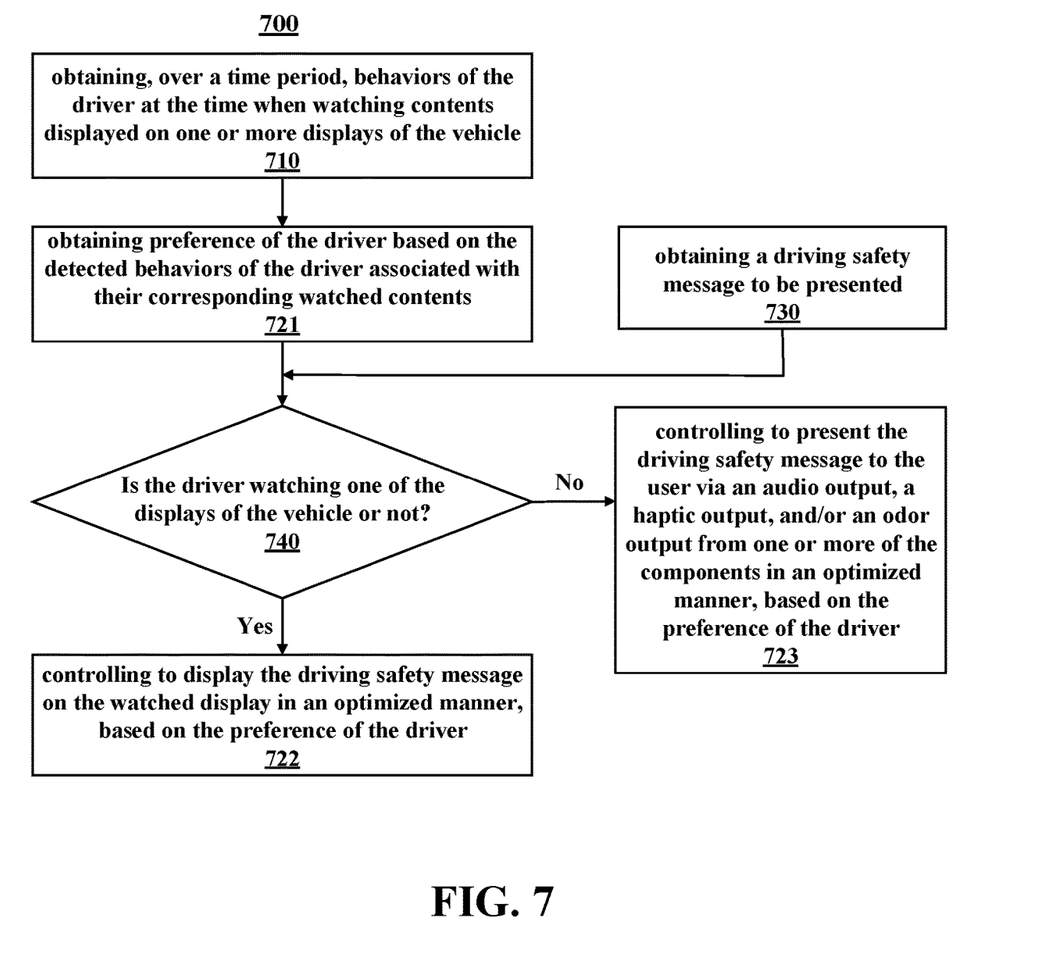
FIG. 7 illustrates a flow chart showing a method for use with a vehicle in accordance with one or more exemplary embodiments of the present disclosure.

FIG. 7 illustrates a flow chart of a specific example of the method 600. In this example, the user to be detected is a driver of the vehicle, and the content to be presented is a driving safety message.

As shown in FIG. 7, at step 710, like the above-mentioned step 610, behaviors of the driver at the time when watching contents displayed on one or more displays of the vehicle are obtained over a time period. At step 721, like the above-mentioned step 621, preference of the driver is obtained based on the detected behaviors associated with their corresponding watched contents.

At step 730, a driving safety message is obtained and is intended to be presented to the driver.

At step 740, a behavior of the driver is detected by using the one or more cameras at the time when the driving safety message is obtained, the behavior indicating whether the driver is watching one of the displays of the vehicle or not.

If "yes" at step 740, proceed to step 722, which controls to display the driving safety message on the watched display in a manner optimized for the driver based on the preference of the driver. If "no" at step 740, proceed to step 723, which controls to present the driving safety message to the driver via an audio output, a haptic output, and/or an odor output from one or more of the components in an optimized manner, based on the preference of the driver.

In some embodiments, the driving safety message to be presented may be the one discussed in the example in relation to the method 500 of FIG. 5, i.e., the warning message regarding overspeed. The channel and/or manner for presenting the driving safety message can be determined based on the behavior of the driver detected when obtaining the message and the preference of the user. For example, in the case of detecting the driver is watching a display, the driving safety message may be displayed on the watched display in a highlighted way or other preferred/effective way; otherwise, the driving safety message may be presented in other particularly preferred/effective manner for the driver. Thus, the safety during the driving can be improved while the user experience can be improved.

In some embodiments, before the optimizing operation, the user's identity (e.g. who is in the driver seat) is detected to ensure personalization.

In some cases, the above methods 200-300 and 500-700 may further comprise, before the step 210 and alternative steps 310 and 510-710 respectively: determining the identity of the user by using the one or more cameras. Then, the above-discussed optimizing step may comprise: optimizing the one or more components of the vehicle for the user, based on the detected figure and/or behavior of the user associated with the identity of the user.

For example, the camera(s) 101 can be used to automatically detect the facial feature, the iris feature or the like of the user, and then the controller 102 can determine the identity of the user based on these features. Combining with the identity of the user, the personalization of the optimizing operation can be ensured, and it will be especially useful for the applications in which there are more than one driver alternatively operating one vehicle.

In some embodiments, there are many kinds of displays disposed in a vehicle, for example, a dashboard typically behind the steering wheel, a central information display typically in the center console, a HUD and/or a rear-seat display, one or more of which can serve as the displays as discussed above. In some embodiments, the displays may comprise one or more of a flat display, a curved display, a flexible display, projection display or the like. It will be apparent to those skilled in the art that the present disclosure is not limited to the above-listed displays, but can be any type of displays.

Please note that, the orders in which the steps of methods 200, 300, 500, 600 and 700 are illustrated in FIGS. 2-3 and 5-7 respectively and described as above are intended to be illustrative only and non-limiting, unless specifically stated otherwise. Please also note that, the details discussed in one of the above embodiments can also be applied to other embodiments, and the above embodiments can be combined arbitrarily, unless specifically stated otherwise.

Figure 8:
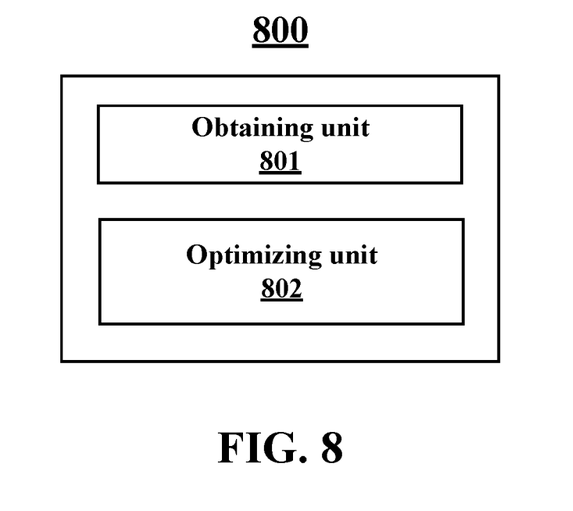
FIG. 8 illustrates a block diagram of an apparatus for use with a vehicle in accordance with one or more exemplary embodiments of the present disclosure.

FIG. 8 illustrates a block diagram of an apparatus 800 for use with a vehicle (e.g., the controller 102 as shown in FIG. 1) in accordance with an exemplary embodiment of the present disclosure. The blocks of the apparatus 800 may be implemented by hardware, software, firmware, or any combination thereof to carry out the principles of the present disclosure. It is understood by those skilled in the art that the blocks described in FIG. 8 may be combined or separated into sub-blocks to implement the principles of the present disclosure as described above. Therefore, the description herein may support any possible combination or separation or further definition of the blocks described herein.

Referring to FIG. 8, the apparatus 800 may comprise: an obtaining unit 801 for obtaining a figure and/or a behavior of a user sat in the vehicle, which is detected by using one or more cameras located in the vehicle; and an optimizing unit 802 for optimizing one or more components of the vehicle for the user, based on the detected figure and/or behavior of the user.

Please note that, the respective units in the apparatus 800 can be configured to perform the respective operations as discussed above in the methods 200, 300, 500, 600 and 700 respectively shown in FIGS. 2-3 and 5-7, and thus their details are omitted here. Furthermore, the apparatus 800 may comprise additional units (not shown) for performing the steps as discussed above in the methods 200, 300, 500, 600 and 700, if needed.

Figure 9:
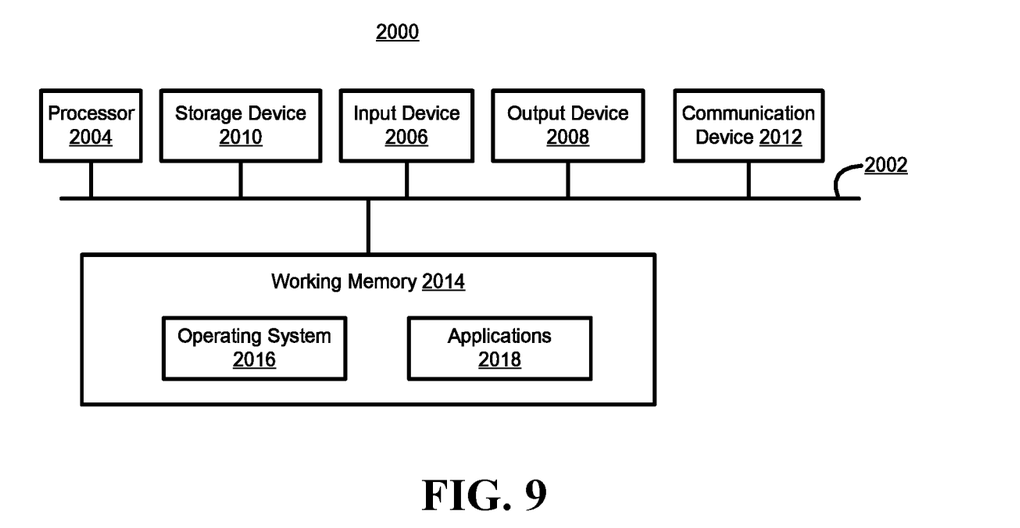
FIG. 9 illustrates a general hardware environment wherein the present disclosure is applicable in accordance with one or more exemplary embodiments of the present disclosure.

FIG. 9 illustrates a general computing device 2000 wherein the present disclosure is applicable in accordance with one or more exemplary embodiments of the present disclosure.

With reference to FIG. 9, a computing device 2000, which is an example of the hardware device that may be applied to the aspects of the present disclosure, will now be described. The computing device 2000 may be any machine configured to perform processing and/or calculations, may be but is not limited to a work station, a server, a desktop computer, a laptop computer, a tablet computer, a personal data assistant, a smart phone, an on-vehicle computer or any combination thereof. The aforementioned controller 102, or the apparatus 800 for use with the vehicle may be wholly or at least partially implemented by the computing device 2000 or a similar device or system.

The computing device 2000 may comprise elements that are connected with or in communication with a bus 2002, possibly via one or more interfaces. For example, the computing device 2000 may comprise the bus 2002, one or more processors 2004, one or more input devices 2006 and one or more output devices 2008. The one or more processors 2004 may be any kinds of processors, and may comprise but are not limited to one or more general-purpose processors and/or one or more special-purpose processors (such as special processing chips). The input devices 2006 may be any kinds of devices that can input information to the computing device, and may comprise but are not limited to a mouse, a keyboard, a touch screen, a microphone and/or a remote control. The output devices 2008 may be any kinds of devices that can present information, and may comprise but are not limited to display, a speaker, a video/audio output terminal, a vibrator and/or a printer. The computing device 2000 may also comprise or be connected with non-transitory storage devices 2010 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 2010 may be detachable from an interface. The non-transitory storage devices 2010 may have data/instructions/code for implementing the methods and steps which are described above. The computing device 2000 may also comprise a communication device 2012. The communication device 2012 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device, WiFi device, WiMax device, cellular communication facilities and/or the like. The transmitter/receiver/communication device as aforementioned may, for example, be implemented by the communication device 2012.

When the computing device 2000 is used as an on-vehicle device, it may also be connected to external device, for example, a GPS receiver, sensors for sensing different environmental data such as an acceleration sensor, a wheel speed sensor, a gyroscope and so on. In this way, the computing device 2000 may, for example, receive location data and sensor data indicating the travelling situation of the vehicle. When the computing device 2000 is used as an on-vehicle device, it may also be connected to other facilities (such as an engine system, a wiper, an anti-lock Braking System or the like) for controlling the traveling and operation of the vehicle.

In addition, the non-transitory storage device 2010 may have map information and software elements so that the processor 2004 may perform route guidance processing. In addition, the output device 2006 may comprise a display for displaying the map, the location mark of the vehicle, images indicating the travelling situation of the vehicle and also the visual signals. The output device 2006 may also comprise a speaker for audio output.

The bus 2002 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 2002 may also include a Controller Area Network (CAN) bus or other architectures designed for application on an automobile.

The computing device 2000 may also comprise a working memory 2014, which may be any kind of working memory that may store instructions and/or data useful for the working of the processor 2004, and may comprise but is not limited to a random access memory and/or a read-only memory device.

Software elements may be located in the working memory 2014, including but are not limited to an operating system 2016, one or more application programs 2018, drivers and/or other data and codes. Instructions for performing the methods and steps described in the above may be comprised in the one or more application programs 2018, and the units of the aforementioned controller 102, or the apparatus 800 for use with the vehicle may be implemented by the processor 2004 reading and executing the instructions of the one or more application programs 2018. More specifically, the aforementioned controller 102, or the apparatus 800 for use with the vehicle may, for example, be implemented by the processor 2004 when executing an application 2018 having instructions to perform the steps of the above-mentioned methods. In addition, the obtaining unit 801 of the aforementioned apparatus 800 may, for example, be implemented by the processor 2004 when executing an application 2018 having instructions to perform the step 210 of the method of FIG. 2. Other units of the aforementioned apparatus 800 may also, for example, be implemented by the processor 2004 when executing an application 2018 having instructions to perform one or more of the aforementioned respective steps. The executable codes or source codes of the instructions of the software elements may be stored in a non-transitory computer-readable storage medium, such as the storage device(s) 2010 described above, and may be read into the working memory 2014 possibly with compilation and/or installation. The executable codes or source codes of the instructions of the software elements may also be downloaded from a remote location.

It should further be understood that the components of computing device 2000 can be distributed across a network. For example, some processing may be performed using one processor while other processing may be performed by another processor remote from the one processor. Other components of computing system 2000 may also be similarly distributed. As such, computing device 2000 may be interpreted as a distributed computing system that performs processing in multiple locations.

Although some specific embodiments of the present invention have been demonstrated in detail with examples, it should be understood by a person skilled in the art that the above examples are only intended to be illustrative but not to limit the scope of the present invention. Various combinations of the aspects/embodiments in the specification shall be contained in the protection scope of the present invention. It should be understood by a person skilled in the art that the above embodiments can be modified without departing from the scope and spirit of the present invention. The scope of the present invention is defined by the attached claims.

What is claimed is:

1. An apparatus for use with a vehicle, comprising:
one or more cameras located in the vehicle and configured to detect a figure and a behavior of a user in the vehicle; and
a controller in communication with the cameras, configured to:
obtain the detected figure and behavior of the user; and
optimize a position of and a content presentation by one or more components of the vehicle for the user, based on the detected figure and behavior of the user, wherein the one or more components are audio, visual, olfactory and/or haptic devices.

2. The apparatus according to claim 1, wherein optimizing the position of the one or more components comprises: adjusting the position of the one or more components so as to facilitate the driver to operate the vehicle.

3. The apparatus according to claim 1, wherein optimizing the content presentation by the one or more components comprises: controlling which of the one or more components the content is presented by.

4. The apparatus according to claim 3, wherein the content is a driving safety message and the user is a driver of the vehicle, and controlling the presentation of the content comprises:
in response to the detected behavior indicating the driver is watching a display of the vehicle, controlling a displaying of the driving safety message on the display; and
in response to the detected behavior indicating the driver is not watching the display, controlling the presentation of the driving safety message to the driver via an audio output, a haptic output, and/or an odor output from one or more of the components.

5. The apparatus according to claim 3, wherein the one or more cameras are used to detect, over a time period, behaviors of the user at the time when watching content displayed on one or more displays of the vehicle, and the operation of controlling the presentation of the content comprises:
obtaining preference of the user based on the detected behaviors of the user associated with the user's corresponding watched contents; and
optimizing one or more of the components to present the content for the user, based on the preference of the user.

6. The apparatus according to claim 5, wherein the optimizing one or more of the components to present the content comprises at least one of:
selecting one or more preferred contents to be displayed on one of the displays from candidate contents, based on the preference of the user;
recommending one or more preferred contents to be displayed on one of the displays, based on the preference of the user;
determining a displaying format for a content to be displayed on one of the displays, based on the preference of the user; or
selecting at least one presentation channels for presenting the content to the user, based on the preference of the user, wherein the presentation channels are configured to provide at least one of a visual output, an audio output, a haptic output, or an odor output for the content.

7. The apparatus according to claim 5, wherein the obtaining the preference of the user comprises:
extracting information regarding the respective contents from the behaviors of the user associated with the user's corresponding contents, the information including at least one of: time spent on the content by the user, sentiment of the user when watching the content, classifying information of the content, a transitionary effect for displaying the content, an interesting portion in the content, metadata of the content, or a key word of the content; and
obtaining the preference of the user based on the extracted information.

8. The apparatus according to claim 5,
wherein the user is a driver of the vehicle, and the one or more cameras are further used to detect whether the driver is watching one of the displays of the vehicle or not at the time when a driving safety message is obtained,
wherein the content to be presented is the driving safety message, and
wherein the operation of optimizing one or more of the components to present the content further comprises:
in response to the driver watching one of the displays of the vehicle, controlling to display the driving safety message on the watched display in a manner optimized for the driver, based on the preference of the driver; and
in response to the driver not watching any display of the vehicle, controlling to present the driving safety message to the user via an audio output, a haptic output, and/or an odor output from one or more of the components in a manner optimized for the driver, based on the preference of the driver.

9. The apparatus according to claim 1, wherein the cameras are further used to determine the identity of the user, and the controller is configured to optimize the one or more components of the vehicle for the user, based on the detected figure and/or behavior of the user associated with the identity of the user.

10. A computer-implemented method for use with a vehicle, characterized by comprising steps of:
obtaining a figure and a behavior of a user in the vehicle, which is detected by using one or more cameras located in the vehicle; and
optimizing a position of and a content presentation by one or more components of the vehicle for the user, based on the detected figure and behavior of the user, wherein the one or more components are audio, visual, olfactory and/or haptic devices.

11. The method according to claim 10, wherein optimizing the position of the one or more components comprises: adjusting the position of the one or more components so as to facilitate the driver to operate the vehicle.

12. The method according to claim 10, wherein optimizing the content presentation by the one or more components comprises: controlling which of the one or more components the content is presented by.

13. The method according to claim 12, wherein the content is a driving safety message and the user is a driver of the vehicle, and the step of controlling to present the content comprises:
in response to the detected behavior indicating the driver is watching a display of the vehicle, controlling to display the driving safety message on the watched display; and
in response to the detected behavior indicating the driver is not watching any display of the vehicle, controlling to present the driving safety message to the driver via an audio output, a haptic output, and/or an odor output from one or more of the components.

14. The method according to claim 12,
wherein the step of obtaining a behavior comprises:
obtaining, over a time period, behaviors of the user at the time when watching contents displayed on one or more displays of the vehicle, which are detected by using the one or more cameras, and
wherein the step of controlling to present a content comprises:
obtaining preference of the user based on the detected behaviors of the user associated with the user's corresponding watched contents; and
optimizing one or more of the components to present a content for the user, based on the preference of the user.

15. The method according to claim 14, wherein the step of optimizing one or more of the components to present a content comprises at least one of:
selecting one or more preferred contents to be displayed on one of the displays from candidate contents, based on the preference of the user;
recommending one or more preferred contents to be displayed on one of the displays, based on the preference of the user;
determining a displaying format for a content to be displayed on one of the displays, based on the preference of the user; or
selecting at least one presentation channels for presenting a content to the user, based on the preference of the user, wherein the presentation channels are configured to provide at least one of a visual output, an audio output, a haptic output, or an odor output for the content.

16. The method according to claim 14, wherein the step of obtaining the preference of the user comprises:
extracting information regarding the respective contents from the behaviors of the user associated with the user's corresponding contents, the information including at least one of: time spent on the content by the user, sentiment of the user when watching the content, classifying information of the content, a transitionary effect for displaying the content, an interesting portion in the content, metadata of the content, or a key word of the content; and
obtaining the preference of the user based on the extracted information.

17. The method according to claim 14,
wherein the user is a driver of the vehicle;
wherein the step of obtaining a behavior further comprises: obtaining a behavior indicating whether the driver is watching one of the displays of the vehicle or not at the time when a driving safety message is obtained, which is detected by using the one or more cameras;
wherein the content to be presented is the driving safety message, and
wherein the step of optimizing one or more of the components to present a content further comprises:
in response to the behavior indicating the driver is watching one of the displays of the vehicle, controlling to display the driving safety message on the watched display in a manner optimized for the driver, based on the preference of the driver; and
in response to the behavior indicating the driver is not watching any display of the vehicle, controlling to present the driving safety message to the driver via an audio output, a haptic output, and/or an odor output from one or more of the components in a manner optimized for the driver, based on the preference of the driver.

18. The method according to any one of claim 10, further comprising:
before the step of obtaining the figure and/or the behavior of the user in the vehicle, determining the identity of the user by using the one or more cameras, wherein the step of optimizing one or more components of the vehicle for the user comprises: optimizing the one or more components of the vehicle for the user, based on the detected figure and/or behavior of the user associated with the identity of the user.

19. An apparatus for use with a vehicle, comprising:
one or more processors; and
one or more memories configured to store a series of computer executable instructions, wherein the series of computer executable instructions, when executed by the one or more processors, cause the one or more processors to perform the method of claim 10.

20. A non-transitory computer readable medium having instructions stored thereon that, when executed by one or more processors, causing the one or more processors to perform the method of claim 10.

* * * * *